United States Patent [19]

Scott

[11] Patent Number: 5,280,458
[45] Date of Patent: Jan. 18, 1994

[54] SUNLIT WORLD GLOBE

[76] Inventor: Craig S. Scott, 1821 123rd Ave. SE., Bellevue, Wash. 98005

[21] Appl. No.: 993,356

[22] Filed: Dec. 18, 1992

[51] Int. Cl.⁵ .................................................. G04B 19/22
[52] U.S. Cl. ........................................ 368/24; 434/143
[58] Field of Search ................................... 368/21-24; 434/142, 143

[56] References Cited

U.S. PATENT DOCUMENTS

| | | |
|---|---|---|
| 1,959,601 | 10/1991 | Schulse . |
| 2,099,518 | 11/1937 | Hazlett . |
| 3,197,893 | 8/1965 | Mariotti ................................ 368/21 |
| 3,305,946 | 2/1967 | Dugardin ............................. 368/24 |
| 4,102,121 | 7/1974 | Vealey ................................. 368/24 |
| 4,477,193 | 10/1984 | Yasufuku . |
| 4,666,310 | 5/1987 | Snadka ............................... 368/24 |
| 4,714,351 | 12/1987 | Domen ............................... 368/17 |
| 4,936,779 | 6/1990 | Carlson .............................. 434/143 |
| 5,030,100 | 7/1991 | Hilderman . |
| 5,057,024 | 10/1991 | Sprott et al. . |
| 5,132,943 | 7/1992 | Davies ................................ 368/21 |

Primary Examiner—Vit W. Miska
Attorney, Agent, or Firm—Michael J. Folise

[57] ABSTRACT

A sunlit world globe provides a realistic and constantly accurate day/night pattern on the surface of the globe. The globe employs an internal, rotating baffle for a light source. The baffle rotates with respect to a semi-transparent shell constituting a planetary model. The shell has an aperture at the bottom so that a motor, fixed to a frame can rotate the baffle through an axle. The shell pivots about a horizontal axis ±23.5 degrees to simulate the earth's orbit around the sun. An adjustment mechanism positions the polar axis of the earth with respect to an imaginary, ecliptic plane appropriately for the current time of year. In an alternate embodiment, the globe rotates with respect to the frame. The frame carries an arch having a day/night demarcation.

12 Claims, 4 Drawing Sheets

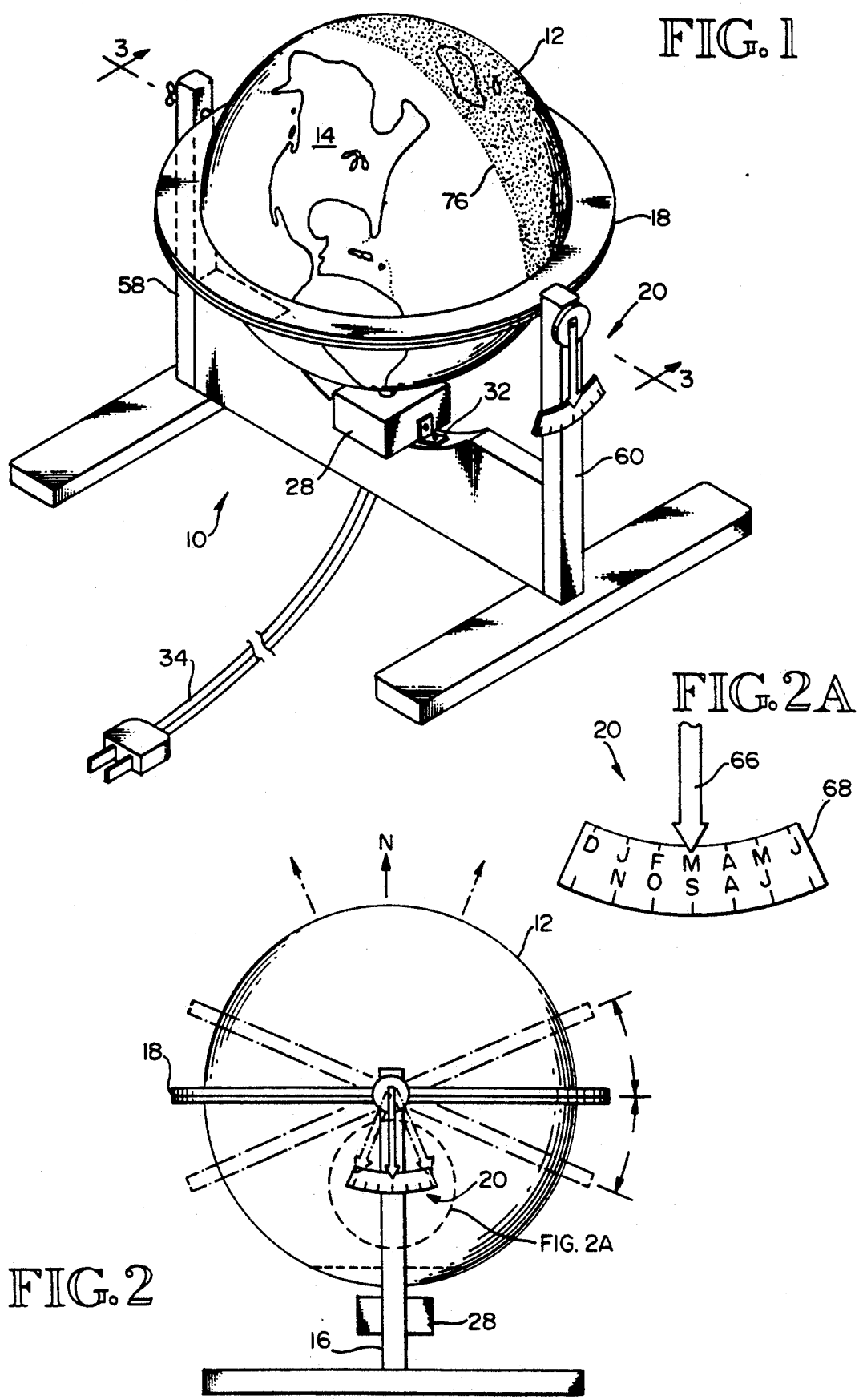

SUNLIT WORLD GLOBE

TECHNICAL FIELD

The invention relates to chronological instruments. More specifically, the invention relates to methods and apparatus indicating day/night demarcations on planetary models.

BACKGROUND OF THE INVENTION

A variety of methods and techniques have been developed for simulating the appearance of sunlight on world globe models. In most embodiments of this concept, a globe model representing the earth is internally illuminated by a baffled light source. The globe is typically semi-transparent, and the baffle is arranged so that one half of the globe is in simulated sunlight, while the remaining half is in simulated darkness. Manual or automatic mechanisms are employed to rotate the globe and baffle with respect to one another so that the demarkation between the night and day hemispheres of the globe rotate once each day (typically one revolution every 23 hours, 56 minutes and four seconds to simulate sidereal time).

The prior art mechanisms for simulating this day/night demarkation range from simple to complex, from manual to automatic. One of the earliest prior art devices is described by Schulse in U.S. Pat. No. 1,959,601 issued on May 22, 1934. Schulse describes a globe which rotates once each 24 hours. A lamp is fixed within and with respect to the globe behind a shield/filter to produce the desired day/night effect. The filter itself rotates about the lamp on an axis which is displaced 23.5 degrees with respect to the polar axis of the globe once each 365 days to simulate the effect of the seasons on the day/night illumination pattern. A conventional clock automatically drives the globe and shield/filter. Schulse's mechanism is relatively complex involving multiple gear trains and slip clutches, worm drives and concentric, rotating shafts all of which contribute to a relatively expensive chronological instrument. Devices such as this have not been accepted into the marketplace.

Others, such as Carlson in U.S. Pat. No. 4,936,779 have provided an internally illuminating globe which simulates the day/night pattern on the surface on the earth with a substantially less complex mechanism. In Carlson, a lamp and interior baffle rotate once every 24 hours with respect to the globe to simulate a day/night illumination pattern through a semi-transparent globe shell. As is well known, the actual day/night pattern of the surface of the earth oscillates through ±23.5 degrees with respect to the polar axis as the earth completes a circumrevolution about the sun. In order to avoid the complexities of devices such as those described by Schulse, Carlson employs an adjustable cam mechanism by way of an exterior knob and flexible cable. Adjustment of the knob rocks the baffle back and forth about an axis passing through the equator of the model to simulate the seasonal variation of the light pattern on the globe. Although Carlson's mechanism is substantially less complex than many prior art devices, the device is believed to nevertheless remain excessively complex to succeed in the marketplace.

Whereas Carlson's and Schulse's devices described above are completely automatic (i.e. motor driven) others have attempted to avoid complexity by combining a completely manually driven globe simulating the day/night illumination pattern on the earth. The device disclosed by Gardin in U.S. Pat. No. 3,305,946 is intermediate in complexity between Schulse and Carlson in that adjustment of a single time of day ring, and day of year ring is sufficient to position an internal lamp with baffle appropriately to simulate the correct day/night pattern on the surface of the globe for a given time of day and year. Nevertheless, Gardin's mechanism still employs a plurality of beveled gears, counter-rotating shafts, etc. and has not found commercial acceptance in the marketplace. Other examples of day/night illuminating globes are provided by Veazey in U.S. Pat. No. 4,102,121, Domen in U.S. Pat. No. 4,714,351 and Mariotti in U.S. Pat. No. 3,197,893. In each of the devices described in these patents, a different mechanism is employed to impart an appropriate "nodding" motion to an internal baffle to simulate the effect of the earth's orbit about the sun on a simulated day/night pattern for their globes. In each case, the mechanisms are complex and do not lend themselves to inexpensive production techniques.

Therefore, a need exists for a world globe model which indicates a day/night demarkation on the surface of the globe model with a simple, reliable and inexpensive mechanism.

A need also exists for a globe model which simulates a day/night illumination pattern with a simple, reliable and economical mechanism.

SUMMARY OF THE INVENTION

It is therefore an object of the present invention to provide a day/night globe or other planetary model which indicates a continuously accurate day/night demarkation on the globe's surface with a simple, reliable and economical mechanism.

It is a further object of the invention to provide an illuminated day/night planetary model which simulates both the rotation of the model with respect to the sun, and the orbit of the model with respect to the sun in a mechanism which is simple, reliable and inexpensive to manufacture.

The invention achieves these and other objects and advantages which will become apparent in the description which follows by providing a sphere for representing the planetary surface. The sphere is supported by a substantially equatorial support annulus located substantially parallel to an equatorial plane of the sphere. The support annulus is pivotally connected to a frame on a seasonal axis within the equatorial plane. A seasonal adjustment mechanism is journaled for rotation with the support annulus so that adjustment thereof places the polar axis of the sphere at an appropriate declination for a given month.

A rotational mechanism rotates a day/night demarkation on the surface of the sphere approximately once each day so that by setting the seasonal adjustment mechanism appropriately and rotating the day/night demarkation on the sphere, a substantially correct day/night demarkation for a given time of year and local time of day is produced. The sphere thus being substantially equitorially supported, and the equatorial support being pivoted to provide the polar axis (or equatorial plane) with the correct declination with respect to an imaginary ecliptic plane, this day/night cycle can be simulated by a relatively simple mechanism.

In a preferred, illuminated embodiment of the invention, the sphere is substantially hollow and semi-transparent and the rotating mechanism includes an internal light source mounted on an internal baffle. A motor, fixed to the frame rotates the baffle with respect thereto (and with respect to the sphere) while the sphere "nods" through angles ranging between ±23.5 degrees according to the setting of the seasonal adjustment mechanism. In this manner, approximately one-half of the sphere is bathed in simulated sunlight, and the remaining half is in simulated darkness for a given local time of day and month of year. Rotation of the baffle by the motor simulates the motion of the sun across the surface of the sphere. An aperture, in the southern polar region of the sphere subtending an angle of approximately 47 degrees allows an axle to connect the motor with the rotating baffle throughout the seasonal "nodding" motion of the sphere by adjustment of the seasonal adjustment mechanism. A substantially opaque, boot can fill the aperture to prevent leakage of light from inside the sphere through the aperture.

In an alternate, non-illuminated embodiment of the invention, the internal baffle and light source are replaced by an external arch connected to the frame which subtends at least an upper hemisphere of the planetary model. In this embodiment, a motor rotates the globe with respect to the frame beneath the arch. One side of the arch is provided with a day indicator (i.e. white paint) while the remaining side is provided with a night indicator (i.e. black paint). As the globe rotates beneath the arch, the "day" portion of the globe is indicated on the "day" side of the arch while the "night" portion of the sphere is indicated on the "night" side of the arch. In this alternate embodiment, the seasonal adjustment mechanism is set as in the preferred embodiment so that the planetary model has the correct polar/equatorial declination with respect to the arch for any given month or mid-month period of the year.

A time calculating ring can be positioned on top of the equatorial support annulus of either the preferred or the alternate embodiment to permit manual calculation of time differences at any longitude on the planetary model.

BRIEF DESCRIPTION OF THE DRAWINGS

FIG. 1 is an isometric view of an internally illuminated day/night globe employing the invention.

FIG. 2 is a side elevational view of the globe shown in FIG. 1.

FIG. 2A is an enlarged, elevational view of circled area 2A in FIG. 2.

DETAILED DESCRIPTION OF THE PREFERRED EMBODIMENTS

Figure 3:
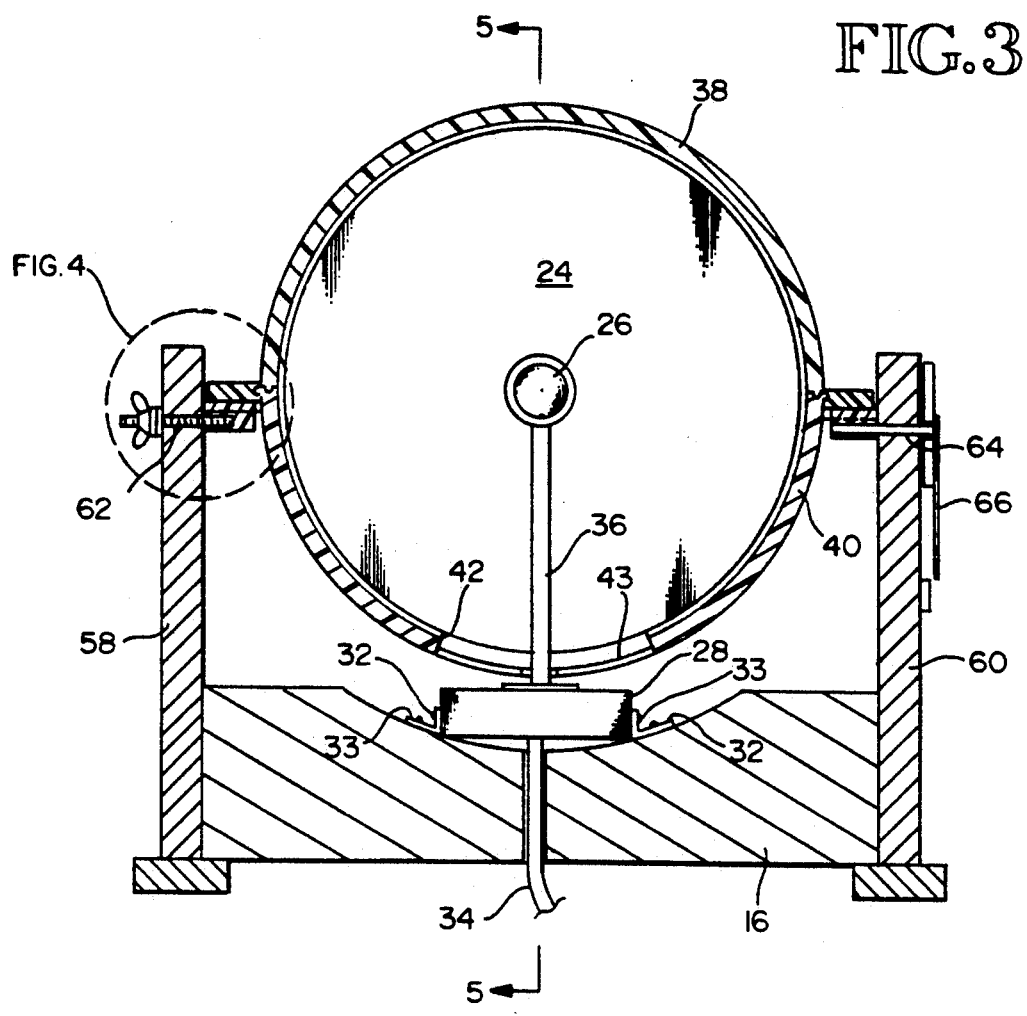
FIG. 3 is a cross-sectional view taken along line 3—3 of FIG. 1.

A sunlit world globe, in accordance with the principles of the present invention is generally indicated at Reference Numeral 10 in FIG. 1. The globe simulates the day/night appearance of the earth as seen from space with a simple, reliable and economical-to-manufacture mechanism as will be described further hereinbelow. As used herein, the terms "globe", "sphere", and "planetary model" are deemed interchangeable. Although the embodiments shown in the figures represent the planet earth, the structures and mechanisms described herein can be applied to other planetary bodies such as the moon or other planets.

The globe 10 shown in FIG. 1 has a substantially spherical, semi-transparent shell 12 having printed thereon various planetary features 14. The globe can be manufactured from any appropriate material with plastic as the preferred material. A frame 16 supports a substantially equatorial support ring generally indicated at reference numeral 18 which is in contact with the shell 12. A seasonal adjustment mechanism generally indicated at reference numeral 20 pivotally interconnects the equatorial support ring 18 and the frame 16 so that a substantially vertical polar axis (reference numeral 22 in FIGS. 2 and 5) can be set with the appropriate declination for the month of the year.

Figure 5:
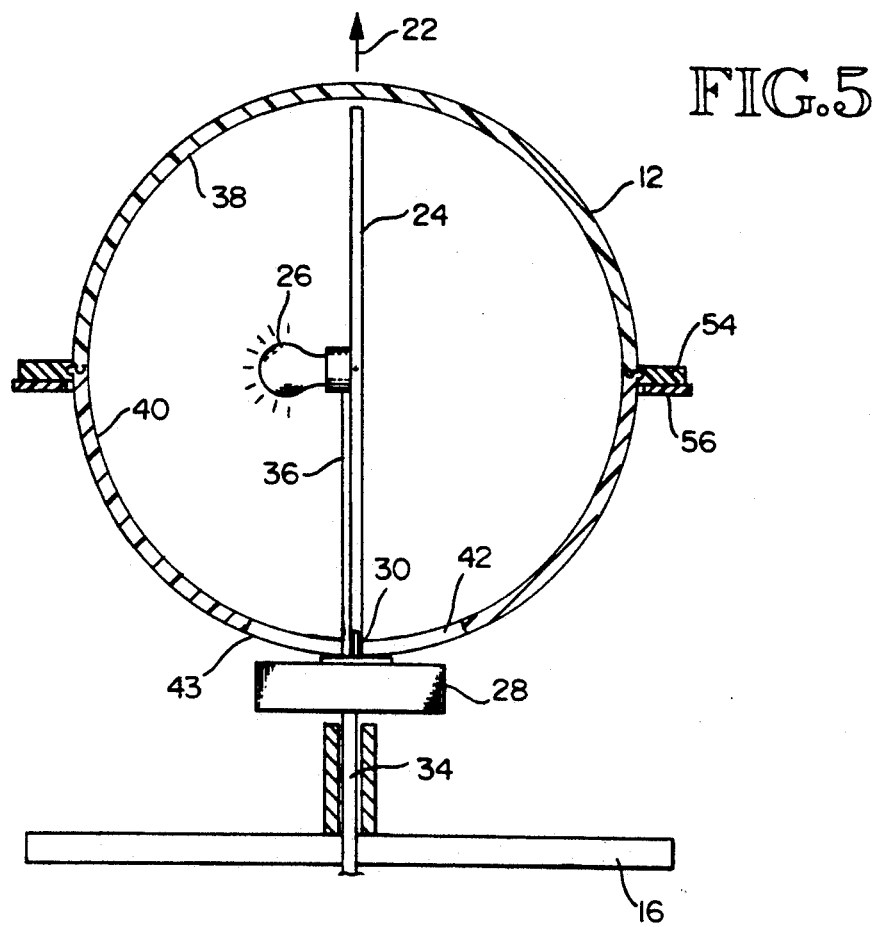
FIG. 5 is a sectional view taken along line 5—5 of FIG. 3.

As best seen in FIGS. 3 and 5, the shell is provided with an interior baffle 24 having an interior diameter slightly smaller than the diameter of the shell 12. The interior baffle supports a conventional incandescent bulb or lamp 26 for illuminating one half of the shell. The baffle can be totally reflective but is preferably semi-transparent so that both hemispheres of the shell are illuminated with the "day" side more brightly illuminated than the "night" side.

A conventional, 60 Hz synchronous electric clock motor (not shown) is contained in a motor housing 28 and drives the baffle 24 and lamp 26 about a vertical axis defined by an axle 30 (see FIG. 5) once every approximately 24 hours. The synchronous clock motor 28 includes a 2:1 reduction gear mechanism of conventional design to convert the motor which completes one revolution every 12 hours into a 24-hour cycle clock. Preferably, the reduction ratio is slightly less then 2:1 so that the baffle revolves once every 23 hours, 56 minutes and 4 seconds to simulate sidereal time. If it is preferred to have the globe 10 simulate solar time, then a reduction ratio of 2:1 will suffice. The motor housing 28 is fixed to the frame 16 by brackets 32 and screws 33 against translational and rotational movement.

A conventional alternating current cord 34 powers the motor in housing 28 with conventional house current. The lamp 26 communicates with inverting circuitry (not shown) of conventional design in the motor housing 28 through a power line 36. The circuitry is entirely of the conventional AC/DC converting type employing a step-down transformer, diode bridge, smoothing capacitor and resistor to convert the 60 Hz household current to 12 volt direct current. The lamp 26 can therefore be any variety of conventional 12 volt DC bulb selected for desired brightness. If desired, a conventional thyristor circuit can be employed to provide a dimmer effect.

The shell 12 is manufactured in northern and southern hemispheres 38, 40 joined by a frictional engagement lip 44. The northern hemisphere has a downwardly depending portion 46 which engages a concavity 48 in the southern hemisphere in an interference fit so that the hemispheres do not become inadvertently dislodged. This construction is simple, inexpensive and facilitates access to rotating baffle 24 and lamp 26. The southern hemisphere 40 has a substantially circular aperture 42 subtending an angle of approximately 47 degrees with respect to the center of the sphere. This aperture allows the shell 12 to "nod" with respect to the frame 16 through an angle of ±23.5 degrees to simulate the position of the earth's polar axis with respect to the ecliptic plane throughout the earth's orbit about the sun. A rubber boot 43 substantially seals the aperture and permits the axle 30 and power line 36 to pass therethrough. The rubber boot has a small opening therein to permit relative rotation of the sphere with respect to the axle and the power cord.

Figure 4:
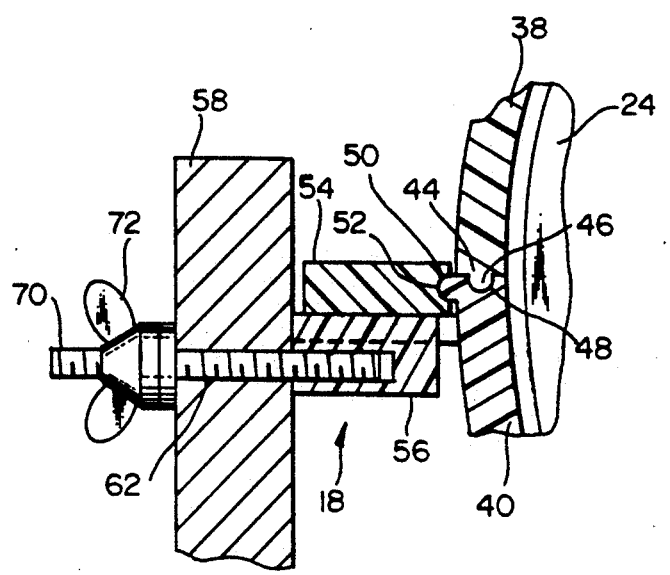
FIG. 4 is an enlarged, partial, sectional view of circled area 4 in FIG. 3.

The power cord 36 communicates with the hereinabove described AC/DC converting circuitry by way of conventional slip rings (not shown) in the motor housing 28 such as those described by Carlson in U.S. Pat. No. 4,936,779, the disclosure of which is incorporated herein by reference. The southern hemisphere also has a radially outwardly directed, circumferential lip 50, best seen in FIG. 4 which is received in a corresponding, concavity 52 in the equatorial support ring 18. The support ring 18 comprises an upper annulus 54 having a substantially smooth, lower bearing surface which is slidable with respect to a lower annulus 56. The upper annulus 54 has an interior diameter which is substantially equal to the diameter of the spherical shell 12 and an outer diameter which is somewhat smaller than the horizontal distance between the inner sides of frame uprights 58, 60. The lower annulus 56 is journaled by pivot pins 62, 64 to the frame uprights 58, 60. The inner diameter of the lower annulus is somewhat larger than the diameter of the spherical shell 12. Thus, the sphere which is fixed to the upper annulus can rotate with respect to the frame 16 because the lower annulus rotatably supports the upper annulus. Thus the sphere 12 and upper annulus can be rotated manually as a unit with respect to the baffle 24 and motor housing 28 without complicated clutch mechanisms, differentials, etc. Simultaneously, the sphere and equatorial support ring 18 can pivot as a unit with respect to the frame 16 about the substantially equatorial (or "seasonal") axis defined by pivot pins 62, 64 which is perpendicular to the polar axis 22 in FIGS. 2 and 5.

It should be apparent that by displacing the equatorial support ring as shown in FIG. 2 from the horizontal position shown in solid lines, the polar axis 22 can be inclined or declined by 23.5 degrees to either the left or the right to simulate the position of the earth's polar axis with respect to the ecliptic plane (represented by the floor on which the frame 16 rests) at various times of the year. For this purpose, the globe is preferably provided with the seasonal adjustment mechanism (or gauge) 20 as shown in FIG. 2 and in detail in FIG. 2A. The seasonal adjustment mechanism includes a pointer 66 journaled for rotation with pivot pin 64. The mechanism is also provided with a scale 68 shown in FIG. 2A having demarcations by month (and mid-month if desired). The months having the summer and winter solstices (June and December) are at far ends of the scale and the months having the vernal and autumnal equinox (March and September) are in the center of the scale. The pivot pin 62 (which is diametrically opposed from pivot pin 64 - see FIG. 4) is provided with threads 70 so that a wing nut 72 can be tightened against a washer 74 with respect to the frame upright 58 to fix the setting of the pointer 66 for the appropriate month of the year. This action establishes a proper relationship between the equatorial support ring 18 and an imaginary ecliptic plane. After setting the pointer appropriately, the sphere 12 can be synchronized with respect to the internal baffle 24 to simulate the correct day/night pattern on the sphere's surface for the appropriate time of day. Such synchronization is easily accomplished. As previously stated, the sphere 22 and upper annulus 54 connected thereto can rotate with respect to the lower annulus 56 and frame 16. The user merely plugs in the motor (which begins rotating the baffle 24 at a slow speed, and illuminates the lamp 26) and then manually rotates the sphere with respect to the baffle until the day/night demarkation 76 is at the correct position for the current time of day while the pointer 66 is positioned on the current month. As long as the sphere is not rotated with respect to the frame, the baffle will remain synchronized as the user adjusts the pointer 66 for different months of the year. The frame 16 can be provided with conventional casters (not shown) to translate or rotate the entire glove 10 with respect to the floor. The lower annulus 56 can be provided with a radially directed, rubber tipped set screw or wing bolt (not shown) for engagement with the sphere 12 to maintain the above described synchronization.

Figure 6:
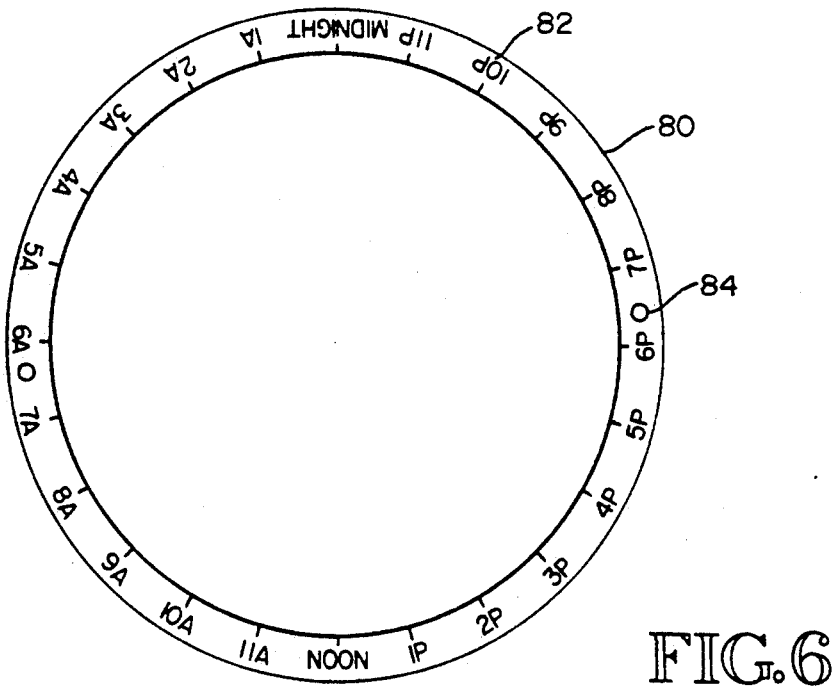
FIG. 6 is a top plan view of a time calculation ring employable with either the preferred or alternate embodiment of the invention.

FIG. 6 illustrates a substantially transparent time ring 80 having demarcations in the form of post meridian and ante meridian markings. The ring is dimensioned so as to reside on top of the upper annulus 54. A knob 84 is fixed to the time ring and permits the user to align the current time demarcations with his local longitude. The remaining demarkations show the corresponding time at other latitudes around the sphere.

Figure 7:
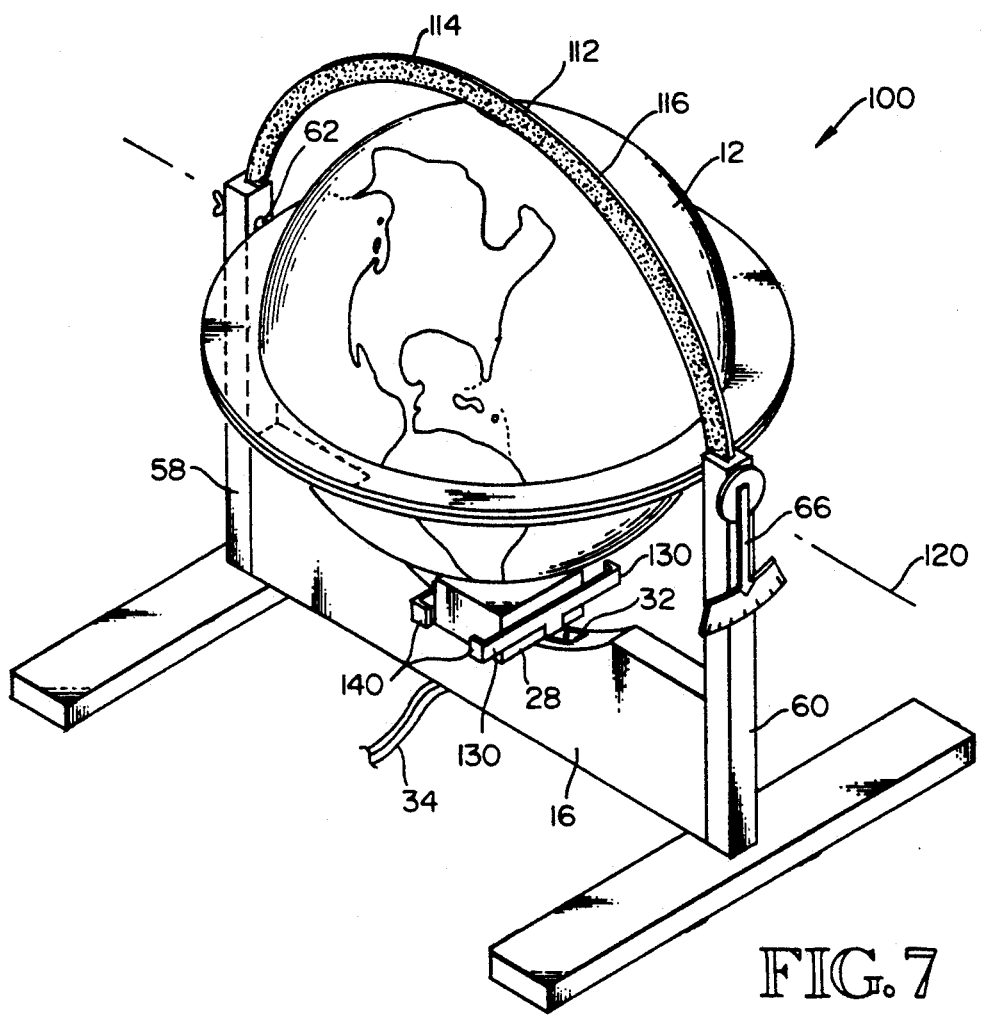
FIG. 7 is an isometric view of an alternate, non-illuminated embodiment of the invention.

FIG. 7 is an alternate embodiment of the invention generally indicated at reference numeral 100. This embodiment utilizes many of the structures of the preferred embodiment shown in FIGS. 1-6 with like elements bearing identical reference numerals. In this embodiment, interior baffle 24, internal lamp 26, aperture 42 and rubber boot 43 are eliminated and are replaced by a day/night arch 112 connected to the uprights 58, 60 of the frame 16.

One side 114 of the arch 112 is painted white to represent the "day" side of the globe 100. The remaining side 116 is painted black to represent the "night" side. In this embodiment, the motor in motor housing 28 rotates the shell 12 with respect to the frame 16 and arch 114. The arch preferably at least circumscribes the northern hemisphere of the sphere, and can be provided with right and left (not shown) continuation portions 118 to demarcate the "day" and "night" sides of the southern hemisphere. The arch 112 is thus fixed to the frame while the sphere 12 rotates thereunder. To accommodate the oscillation of the sphere 12 and motor housing 28 about the equatorial axis 120 defined by the pivot pins 62, 64 the brackets 32 in this embodiment are fixed to the frame 16 but are not fixed to the motor housing 28. In addition, the brackets 32 are provided with tabs 130 extending laterally to provide an elongated bearing surface for the motor housing 28 during its acuate movement. In the preferred embodiment, as best seen in FIG. 3, the brackets 32 are provided on both the right hand and left hand sides of the motor housing 28 and are fixed to both the frame and the motor. In this alternate embodiment 100, the brackets are only fixed to the frame, extend laterally through an angle of ±23.5, and have at the distal ends of the tabs 130 inwardly directed legs 140 to permit the arcuate motion of the motor housing 28. A small clearance is established between the brackets and the motor housing. The motor housing is thus free to swing in an arcuate movement through ±23.5 degrees while the brackets restrict rotation of the motor with respect to the frame.

Both embodiments, while elegant in their simplicity accurately depict a day/night demarkation on the earth's surface. Each embodiment has a minimum of moving parts, is simple to manufacture and is extremely rugged. Those of ordinary skill in the art will perceive other embodiments which although not described in detail here will be obvious variations thereof. For example, the frame 16 can be adapted for mounting on a ceiling of a room. In this embodiment, aperture 42 is placed in the northern, rather than the southern hemisphere. As a further example the motor in motor housing 28 can be replaced with a manually adjustable wheel or dial journaled to the axle 30 so that the baffle 24 can be manually adjusted for educational or demonstration purposes. These other embodiments are considered to fall within the scope of this disclosure.

Therefore, the invention is not to be limited by the description above, but determined in scope by the claims which follow.

I claim:

1. A day/night indicating globe, comprising:
   a sphere for representing a planetary surface, the sphere having a center, an equator defining an equatorial plane, and a polar axis having north and south poles;
   a substantially equatorial support annulus located substantially parallel to the equatorial plane and having an inner diameter no larger than the diameter of the sphere;
   a frame pivotally connected to the support annulus about a seasonal axis within the equatorial plane and substantially perpendicular to the polar axis;
   a seasonal adjustment mechanism journaled for rotation with the support annulus and having an indicator mechanism for indicating the seasonal declination of the equatorial plane with respect to an imaginary ecliptic plane; and
   rotational means for rotating a day/night demarcation of the sphere substantially once each day, whereby setting the seasonal adjustment mechanism causes the equatorial plane to assume an appropriate declination with respect to the imaginary ecliptic plane so that the rotational means indicates a substantially correct day/night demarcation for a given time of year and local time of day.

2. The globe of claim wherein the sphere is substantially hollow and semi-transparent and further defines a substantially circular aperture centered at one of the poles and subtending an angle with respect to the center of approximately forty-seven degrees, wherein the rotational means includes a lamp, means for illuminating the lamp, and a lamp baffle located within the sphere, and an electric timing motor connected to the lamp baffle through the aperture and fixed with respect to the frame so that the baffle and the lamp rotate with respect to the sphere, whereby approximately one-half of the sphere is bathed in simulated sunlight and the remaining half is in simulated darkness at any given instant and so that rotation of the baffle simulates the motion of the sun across the surface of the sphere.

3. The globe of claim 2, wherein the aperture is substantially obscured by a flexible, substantially opaque boot, and wherein the motor is connected to the baffle by an axle penetrating the boot.

4. The globe of claim I, wherein the frame has a substantially vertical arch circumscribing at least an upper half of the sphere having a day indicator on one side and a night indicator on the remaining side, and wherein the rotational means includes a timing motor for rotating the globe approximately once each day with respect to the arch, whereby at any instant the portion of the sphere on the side of the arch having the day indicator thereon is represented as sunlit and the portion of the sphere on the side of the arch having the night indicator thereon is represented as being in darkness.

5. The globe of claim 4, wherein the motor is rotationally fixed and arcuately moveable with respect to the frame so that the globe rotates throughout the adjustment of the seasonal adjustment mechanism.

6. The globe of claim wherein the seasonal adjustment mechanism includes an elongated pointer and a scale having markings corresponding to the months of the year with the months having solstices at far ends of the scale so that the equatorial plane is at its greatest declination when the pointer is so adjusted, and markings corresponding to equinoxes at a center of the scale so that the equatorial plane is at substantially zero declination when the pointer is so adjusted.

7. The globe of claim wherein the equatorial support annulus has a lower, substantially equatorial declination ring having an upper bearing surface and an inner diameter larger than the diameter of the sphere and two radially extending, diametrically opposed pivot pins fixed thereto and pivotally connected to the frame on the seasonal axis, with one of the pins connected to the seasonal adjustment mechanism, and an upper, substantially equatorial support ring connected to the sphere and having a lower bearing surface in sliding contact with the upper bearing surface of the declination ring and an inner diameter no larger than the diameter of the sphere.

8. The globe of claim 7, wherein one of the pins has a frictional mechanism for engaging the frame to maintain the setting of the seasonal adjustment mechanism.

9. The globe of claim 8, wherein the lower declination ring and the upper support ring are substantially transparent.

10. The globe of claim i, including a substantially transparent, rotatable time ring positioned on top of the support annulus for noting local times at various positions on the sphere.

11. A day/night indicating globe, comprising:
    a substantially hollow, semi-transparent sphere for representing a planetary surface, the sphere having a center, an equator defining an equatorial plane, and a polar axis having north and south poles, the sphere further defining a substantially circular aperture centered at the south pole and subtending an angle with respect to the center of approximately forty-seven degrees;
    a substantially equatorial support annulus located substantially parallel to the equatorial plane and having an inner diameter no larger than the diameter of the sphere;
    a frame pivotally connected to the support annulus about a seasonal axis within the equatorial plane and substantially perpendicular to the polar axis;
    a seasonal adjustment mechanism having an indicator mechanism for indicating the seasonal declination of the equatorial plane with respect to an imaginary celestial equator;
    a lamp;
    means for illuminating the lamp;
    a lamp baffle located within the sphere and supporting the lamp;

an electric timing motor connected to the lamp baffle through the aperture and fixed with respect to the frame so that the baffle and the lamp rotate with respect to the sphere, whereby rotation of the baffle simulates the motion of the sun across the surface of the sphere and setting the seasonal adjustment mechanism causes the equatorial plane to assume an appropriate declination.

12. The globe of claim 11, wherein the aperture is substantially obscured by a flexible, substantially opaque boot, and wherein the motor is connected to the baffle by an axle penetrating the boot.

* * * * *

UNITED STATES PATENT AND TRADEMARK OFFICE
CERTIFICATE OF CORRECTION

PATENT NO. : 5,280,458
DATED : January 18, 1994
INVENTOR(S) : Craig S. Scott

It is certified that error appears in the above—identified patent and that said Letters Patent is hereby corrected as shown below:

At column 7, line 46, after the word "claim" insert --1--.
At column 8, line 13, after the word "claim" insert --1--.
At column 8, line 22, after the word "claim" insert --1--.
At column 8, line 41, after the word "claim" change "i" to --1--.

Signed and Sealed this

Twenty-fourth Day of May, 1994

Attest:

BRUCE LEHMAN

Attesting Officer

Commissioner of Patents and Trademarks